(12) United States Patent
Kawatra et al.

(10) Patent No.: US 7,919,064 B2
(45) Date of Patent: Apr. 5, 2011

(54) CAPTURE AND SEQUESTRATION OF CARBON DIOXIDE IN FLUE GASES

(75) Inventors: Surendra Komar Kawatra, Houghton, MI (US); Timothy C. Eisele, Atlantic Mine, MI (US); John J. Simmons, Naples, FL (US)

(73) Assignee: Michigan Technological University, Houghton, MI (US)

( * ) Notice: Subject to any disclaimer, the term of this patent is extended or adjusted under 35 U.S.C. 154(b) by 28 days.

(21) Appl. No.: 12/366,993

(22) Filed: Feb. 6, 2009

(65) Prior Publication Data

US 2009/0202410 A1 Aug. 13, 2009

Related U.S. Application Data

(60) Provisional application No. 61/065,413, filed on Feb. 12, 2008, provisional application No. 61/124,474, filed on Apr. 17, 2008.

(51) Int. Cl.
*B01D 53/62* (2006.01)
(52) U.S. Cl. ........................................ 423/232; 423/430
(58) Field of Classification Search .................. 423/232, 423/430
See application file for complete search history.

(56) References Cited

U.S. PATENT DOCUMENTS

| | | | |
|---|---|---|---|
| 1,400,542 A * | 12/1921 | Harlow | 423/190 |
| 3,264,056 A * | 8/1966 | Konz | 423/232 |
| 3,951,844 A * | 4/1976 | Mago | 252/192 |
| 6,387,337 B1 * | 5/2002 | Pennline et al. | 423/220 |
| 6,648,949 B1 | 11/2003 | Der et al. | |
| 6,655,150 B1 | 12/2003 | Åsen et al. | |
| 6,908,507 B2 | 6/2005 | Lalande et al. | |

* cited by examiner

*Primary Examiner* — Stuart Hendrickson
(74) *Attorney, Agent, or Firm* — James V. Harmon; Charles G. Mersereau; Nikolai & Mersereau, P.A.

(57) ABSTRACT

There is provided a process for the capture and sequestration of carbon dioxide that would otherwise enter the atmosphere and contribute to global warming and other problems. $CO_2$ capture is accomplished by reacting carbon dioxide in flue gas with an alkali metal carbonate, or a metal oxide, particularly containing an alkaline earth metal or iron, to form a carbonate salt. A preferred carbonate for $CO_2$ capture is a dilute aqueous solution of additive-free ($Na_2CO_3$). Other carbonates include ($K_2CO_3$) or other metal ion that can produce both a carbonate and a bicarbonate salt. Examples of suitable metal oxides include several alkaline earths including CaO and MgO. The captured $CO_2$ is preferably sequestered using any available mineral or industrial waste that contains calcium magnesium or iron in non-carbonate forms, or iron in the $Fe^{+2}$ oxidation state.

18 Claims, 8 Drawing Sheets

CAPTURE AND SEQUESTRATION OF CARBON DIOXIDE IN FLUE GASES

CROSS-REFERENCED TO RELATED APPLICATIONS

This application claims priority to Provisional Applications 61/065,413, filed Feb. 12, 2008 and 61/124,474, filed Apr. 17, 2008, the contents of which are deemed incorporated herein by reference in their entirety for any purpose.

STATEMENT REGARDING FEDERALLY SPONSORED RESEARCH OR DEVELOPMENT

Not applicable

BACKGROUND OF THE INVENTION

I. Field of the Invention

The present invention relates generally to the reduction of greenhouse gases in the atmosphere and, more particularly, to the capture and sequestration of carbon dioxide from a variety of sources such as gases from uses involving carbon combustion, a principal source being flue gases, including, without limitation, those from cement plants, fossil fuel fired power plants, and other industrial commercial and domestic emissions. The invention features alkali metal carbonate scrubbing followed by reaction with a metal oxide or metal carbonate to form a salt containing the carbon dioxide in stable form or other sequestering use of carbon dioxide to reduce undesirable effects caused by carbon dioxide released to the atmosphere.

II. Related Art

Carbon dioxide has long been a by-product of many industrial processes. Large amounts of carbon dioxide are released to the atmosphere, for example, by power plants burning carbonaceous fuels, including coal and petroleum products and by Portland cement plants where fossil fuels are burned and $CO_2$ is released in large amount from the calcining of limestone. This generation of large amounts of carbon dioxide was of little or no concern until recently when the participation of carbon dioxide in the accumulation of greenhouse gases and the possible affect this may have on global warming was recognized. It has since become a concern of some urgency such that there exists a definite need to reduce the amount of carbon dioxide released to the atmosphere by combustion processes and coal and petroleum fired electric power plants and plants producing Portland cement have been singled out as examples of process which release vast amounts of $CO_2$ per year.

In response to the rising concern regarding $CO_2$ emissions, techniques and systems have been proposed to reduce $CO_2$ emissions by removal of $CO_2$ from flue gases using a variety of approaches. For example, U.S. Pat. No. 6,655,150 proposes a chemical absorption and desorption process for a power and/or heat generation plant in which the plant exhaust gas is fed to an absorber where $CO_2$ is absorbed using a chemical absorbent leaving a $CO_2$ depleted exhaust gas stream. The $CO_2$ is removed from the absorbent in a desorber and the $CO_s$ is discharged to other uses. That system requires heating, cooling and pressurized vessels and is rather complicated. Another approach is found in U.S. Pat. No. 6,648,949 which discloses a flue stack application for $CO_2$ and particle removal which uses the stack as a biological reactor to promote a photo-synthesis reaction between carbon dioxide and algae-laden water to form carbohydrate products for carbon dioxide sequestration. In U.S. Pat. No. 6,908,507, carbon dioxide is captured in solution using a biologically derived catalyst to hydrate it to carbonate and bicarbonate ions. The catalyst is an enzyme such as carbonic anhydrase, for example. The dissolved carbonate and bicarbonate are then reacted with dissolved metal ions (preferably dissolved lime) to precipitate a stable carbonate, nominally calcium carbonate. While such a approach might be successful, it is noted that it would be quite expensive to provide the enzyme in the quantities required.

Presently, there remains a definite need for the provision of a practical and cost-effective process to remove carbon dioxide from flue gases which can readily be implemented.

SUMMARY OF THE INVENTION

By means of the present invention, there is provided a process for the capture and sequestration of carbon dioxide that would otherwise enter the atmosphere and contribute to global warming and other problems. $CO_2$ capture is accomplished by reacting carbon dioxide in an exhaust gas of interest with a metal carbonate, particularly an aqueous solution of alkali metal carbonate, or a metal oxide, particularly containing an alkali earth metal or a transition metal, to form a salt containing the $CO_2$. A preferred carbonate for $CO_2$ capture is ($Na_2CO_3$). Other carbonates include ($K_2CO_3$) or other metal ion that can produce both a carbonate and a bicarbonate salt. Examples of suitable metal oxides include several alkaline earths including CaO and MgO. The captured $CO_2$ is preferably sequestered using any available mineral or industrial waste (collectively wastes, waste materials or sequestration minerals) that contains calcium or magnesium in non-carbonate forms, or iron in the $Fe^{+2}$ oxidation state. Examples include:

Wollastonite ($CaSiO_3$);

Any of the pyroxene minerals such as diopside ($MgCaSi_2O_6$), hedenbergite ($FeCaSi_2O_6$), augite (($Ca,Mg,Fe)SiO_3$), pigeonite (($Ca,Mg,Fe)(Mg,Fe)Si_2O_6$), clinoenstatite ($Mg_2Si_2O_6$), or clinoferrosilite ($Fe_2Si_2O_6$);

Serpentine minerals (($Mg,Fe)_3Si_2O_5(OH)_4$);

Epidote ($Ca_2Al_2(Fe,Al)(SiO_4)(Si_2O_7)O(OH)$).

Calcium-rich, magnesium-rich, and iron-rich compounds such as cement kiln dusts, metallurgical slags, certain mine tailings, or other high-volume wastes with the correct composition are also suitable.

Preferred sources of the oxides and carbonates comprise waste cement kiln dust or fly-ash that has been collected from coal-burning power plants, stack gas or from fly-ash waste ponds and from other sources, as well as iron smelting, slag containing various amounts of calcium and magnesium oxides ($Na_2CO_3$) that can undergo carbonation reactions. The invention is applicable to waste $CO_2$ for many of a variety of sources including power plants, refineries, vehicles and other sources of waste $CO_2$. The depository compound can be used in commercial products such as concrete blocks, slabs, sheets and columns and in other forms as building products.

A preferred alkali metal carbonate solution contains sodium carbonate and the solution is preferably dilute, i.e., containing from about 1% to about 5% w/w of sodium carbonate. A more preferred solution contains 1.5% to 2.75% w/w sodium carbonate and a most preferred solution contains about 2% w/w sodium carbonate.

The invention process also contemplates in an embodiment controlled release of the captured or sequestered $CO_2$ from a depository compound followed by pressurization for later use or storage of the $CO_2$ gas under stable conditions, e.g., subterranean storage in depleted oil wells or other underground locations and the like. The $CO_2$ may be further purified with additional processing if desired.

A system for capturing and sequestering carbon dioxide in effluent or exhaust gases of interest is also contemplated that includes a flue gas scrubber and a variety of sequestration devices. The effluent gas scrubber employs an aqueous carbonate scrubbing solution that captures the carbon dioxide as a bicarbonate solution and may be connected to a regenerator to release the $CO_2$ and regenerate the carbonate solution for reuse. The $CO_2$ may be sent to the sequestration device for reaction to form a stable carbonate or compressed and sent for other sequestration uses, possibly including purification or underground storage.

DETAILED DESCRIPTION

Figure 1:
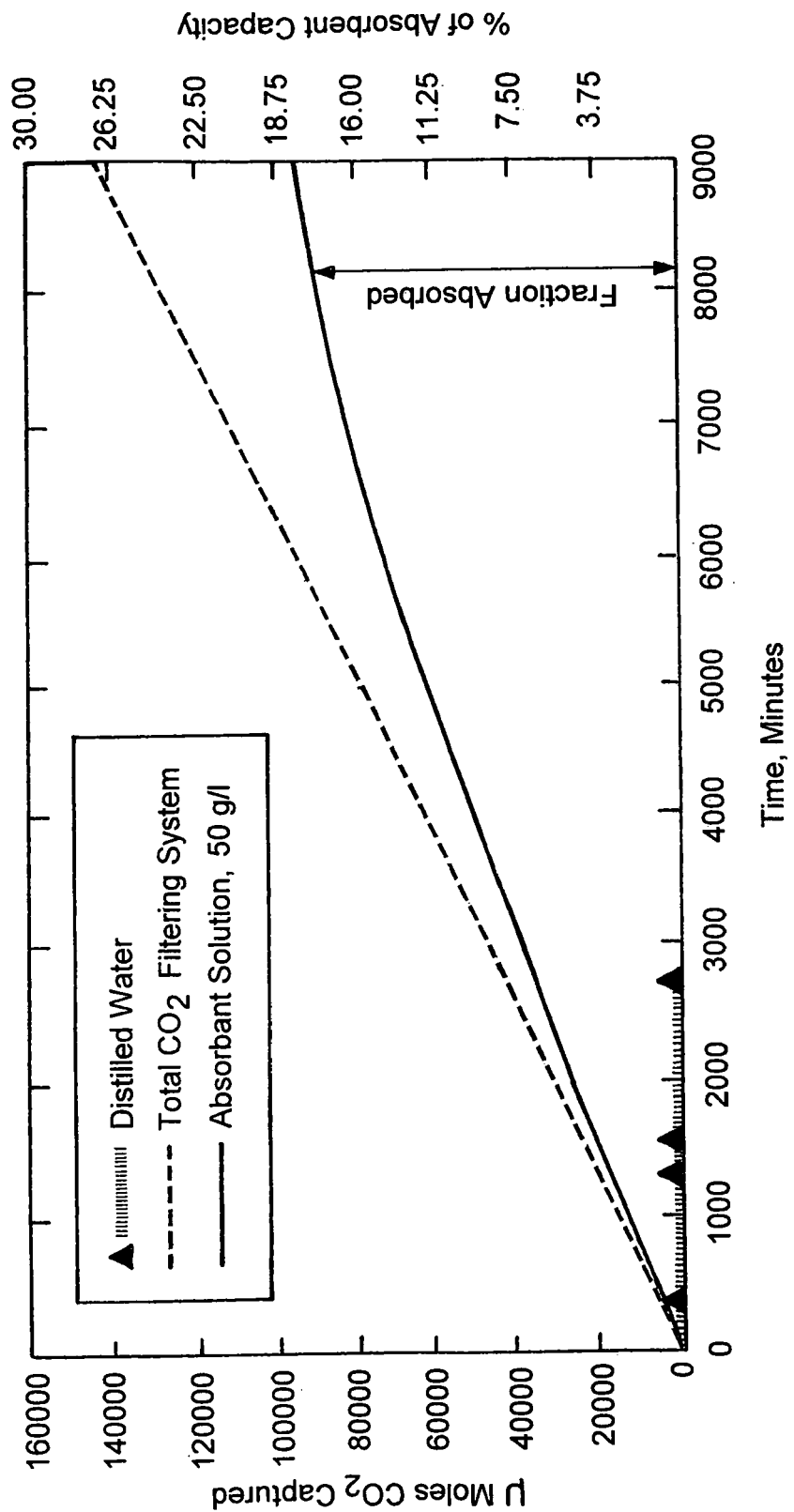
FIG. 1 is a graphical representation showing the capture of $CO_2$ from ambient air by an alkali metal carbonate solution.

The following detailed description includes an explanation of one or more embodiments that illustrate the inventive concept. It will be understood that these embodiments are presented as examples and are not meant to limit the scope of the invention in any manner.

As indicated, the main thrust of the invention is to provide practical processes to reduce $CO_2$ emissions in effluent, exhaust or other $CO_x$-bearing gases from a variety of sources. The process initially involves scrubbing and capture of carbon dioxide from $CO_2$ bearing gases so that it can be sequestered by any of several means (for example, reaction with alkaline earth metal-bearing minerals, such as calcium-bearing materials, underground injection, or other means, as will be explained), utilized as a feedstock for production of marketable materials such as building materials or released for other uses or storage.

Scrubbing is preferably carried out by aqueous alkali metal carbonate solutions, particularly sodium carbonate ($Na_2CO_3$), which reversibly convert to solutions of bicarbonate ($NaHCO_3$) according to reactions of the form:

$$Na_2CO_3(aq) + CO_2 + H_2O \rightleftharpoons 2NaHCO_3(aq)$$
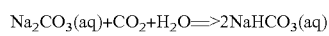

$CO_2$ can also be conveniently captured using potassium carbonate ($K_2CO_3$) as follows:

$$K_2CO_3(aq) + H_2O + CO_2 \rightarrow 2KHCO_3(aq)$$
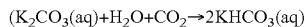

Carbonate solutions that convert to bicarbonate can absorb large quantities of $CO_2$ from gas streams, even gases with a very low level of $CO_2$ such as ambient air. Experiments with one such solution measured its ability to reduce the $CO_2$ levels in normal room air, with the results shown in FIG. 1. Fresh absorbent solution removed 90% of the $CO_2$ from the air passed through it, which is an extremely high level of removal, particularly considering the very low levels of $CO_2$ present in the air. Even after it had been loaded to 15% of its theoretical absorption capacity, the solution was still removing over 50% of the $CO_2$ from the air.

Furthermore, as shown in Examples I and II below, it has been discovered that dilute aqueous alkali metal carbonate solutions (about 1% w/w to about 5% w/w) actually are more efficient absorbers of $CO_2$ from flue streams with relatively high levels of $CO_2$ (up to about 16% $CO_2$ w/w) than more concentrated carbonate solutions.

An important aspect in accordance with the present invention is that the aqueous alkali metal carbonate solution can be and is preferably free of additives such as enzymes, chlorophyll, etc., as these additives add cost and are unnecessary to the present process. Thus, the aqueous alkali metal carbonate solution may be referred to herein as additive-free, meaning that no active additives have been purposely added.

Once a carbonate solution has been converted to a bicarbonate, there are generally two preferred options for transferring the carbon dioxide that it contains to be either sequestered or utilized. The first option is to warm the bicarbonate solution to a temperature that will cause it to decompose and release the carbon dioxide as a concentrated gas.

This reaction when heat is added is as follows:

$$2NaHCO_3 + \Delta(Heat@140\text{-}160°\ F.) \rightarrow Na_2CO_3 + H_2O + CO_2\uparrow \qquad 1$$
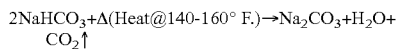

$$2KHCO_3 + \Delta(Heat@\_\text{-}\_°\ F.) \rightarrow K_2CO_3 + H_2O + CO_2\uparrow \qquad 2$$
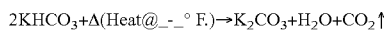

The second option is to inject the bicarbonate solution into mineral and industrial wastes so that it can react directly with the minerals, in the process converting the bicarbonate solution back into a carbonate solution to be recycled for reuse. It will be appreciated that water is a necessary catalyst for mineral carbonation reactions to occur at a reasonable rate. The first option has the advantage of minimizing the losses of the scrubbing solution along with the sequestered carbonate minerals, but requires a source of heat and a cooling system to regenerate the scrubbing solution and prepare it to absorb additional carbon dioxide. The second option has the advantage that it does not require any external heat sources, but it will result in some unavoidable losses of the scrubbing solution and may allow some contamination by minerals dissolved from the mineral and industrial wastes. Based on these two options, the implementation of the invention could be carried out as shown in either FIG. 2 or FIG. 3.

Figure 2:
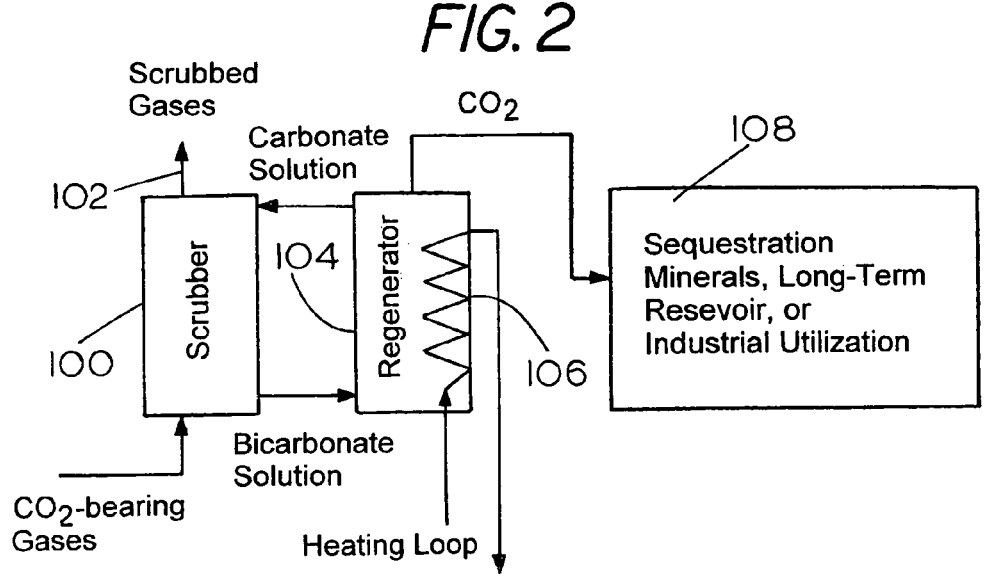
FIG. 2 is a schematic diagram of a carbonate scrubbing process in which the bicarbonate solution is regenerated to carbonate and recycled to the scrubber.

In FIG. 2, there is shown an implementation using thermal regeneration of bicarbonate solution to carbonate solution in which $CO_2$-bearing gases are directed through a scrubber 100 containing an aqueous alkali metal carbonate solution. It will be understood that in accordance with known scrubber technology, the scrubber used to capture $CO_2$ from the flue gases may use the latest cascading and recirculating techniques to maximize the contact between the solution and the flue gases. The scrubbed gases exit at 102 and the reacted, $CO_2$-laden bicarbonate solution is directed to a regenerator 104 where it is heated by a heating loop 106 to drive off the $CO_2$ and regenerate the carbonate solution which is recycled to the scrubber. The concentrated $CO_2$ stream leaving the regenerator is sequestered using minerals, as will be explained, sent to a long term reservoir or taken for some other industrial use at 108. The concentrated $CO_2$ can be compressed and used for oil well pressurization or purifying for other commercial uses.

Figure 3:
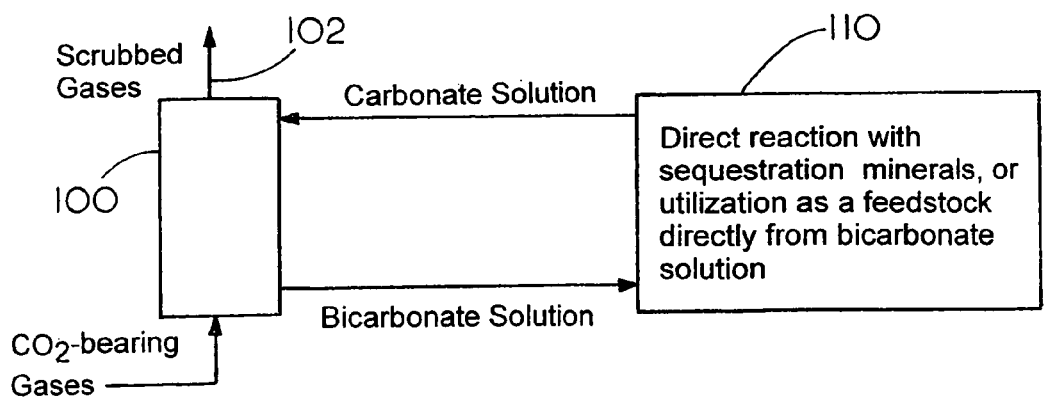
FIG. 3 is a schematic diagram of a carbonate scrubbing process which includes the direct reaction of bicarbonate solution with sequestration minerals to regenerate carbonate solution.

In FIG. 3, the $CO_2$-laden bicarbonate solution recovered from the scrubber 100 is directly reacted with sequestration minerals or used as a feedstock directly from the bicarbonate solution as shown at 110. A lesser amount of the carbonate solution is recovered and recycled to the scrubber.

An important aspect of the invention is the success of carbon dioxide sequestration in existing or future stockpiles of mineral and industrial wastes. This approach has the following major advantages: First, the carbon dioxide will be sequestered in long-term stable mineral carbonates; and second, most suitable mineral and industrial wastes are finely divided already and require no mining and little or no expensive grinding to make them suitable for reaction with $CO_2$.

Permanent sequestrations of $CO_2$ requires large volumes of material that can bind it into a long-term stable form. There must be little or no chance that the carbon dioxide will be unintentionally released back into the atmosphere, as that would defeat the entire purpose of sequestration. A particularly stable form is found in mineral carbonates, which are safe and stable over geological time periods. These are produced by reacting alkali-bearing minerals with carbon dioxide forming insoluble alkali carbonates.

The current problem in trying to use minerals for sequestration of $CO_2$ is that natural minerals need to be mined, crushed and ground to make them reactive enough to take up $CO_2$ rapidly (FETC, 1999). This is an energy-intensive and expensive process that makes conventional mineral carbonation, as proposed to date, impractical.

However, there are sources of minerals that can undergo carbonation to sequester $CO_2$ without the need for expensive pre-processing. Many industrial processes produce by-products that include high volumes of dusts, slags, sludges and artificially-broken rock such as mining overburden and tailings, which have the necessary fine size distribution to be highly reactive, therefore, be suitable for $CO_2$ sequestration without further crushing and grinding. Examples include, but are not limited to:

Cement-kiln dusts (CKD), which are finely-divided powders that are extremely rich in calcium oxides, calcium silicate glasses and other phases that readily undergo carbonation. Highly alkaline cement kiln dust (CKD) has been accumulating in the U.S. for nearly 100 years and there are an estimated half a billion tons of this material stockpiled around the country (EPA, 1996)

Fly-ash, which largely consists of calcium-rich aluminosilicate glasses. Fly-ash is a by-product of coal combustion principally associated with electric power generating plants and 50 million metric tons are produced in the U.S. per year (USGS, 1999).

Mine overburden and tailing stockpiles, stone quarry sludges and similar mining residues. These contain a broad variety of minerals amenable to carbonation, particularly feldspars, serpentines and other calcium or magnesium aluminosilicates. Mining residues that will be particularly rich in such materials are those that are igneous in nature, which include many of the common ores of titanium, nickel, copper, uranium and rare earths. Exact estimates of total quantities are not available, but it is estimated that approximately 8 billion tons of mining residues are produced annually (USGS, 1999). Including stockpiles from past operations, the total amount of material available is believed to amount to as much as 400 billion tons.

Metallurgical Slags. Slags, particularly iron and steelmaking slags, are rich in calcium compounds that can absorb $CO_2$. Like CKD, the industries that produce slags are also major emitters of carbon dioxide, and would benefit by being able to sequester a portion of their emissions by this means. An estimated 18 million tons of slags are produced annually.

All of these materials contain varying amounts of oxides, particularly magnesium and calcium oxides, that can undergo carbonation reactions in the presence of water similar to the following:

$$CaO + CO_2 = CaCO_3; \qquad (1)$$

$$MgO + CO_2 \Longrightarrow MgCO_3 \qquad (2)$$

Both magnesium carbonate and calcium carbonate are very stable. Magnesium carbonate must be heated above 350° C. before it will re-release $CO_2$ and calcium carbonate must be heated to 825° C. before it will decompose. They are also insoluble or only sparingly soluble in water. These compounds can be used in commercial products such as concrete block, slab, sheets and columns. In general, any silicate or aluminosilicate mineral that contains calcium or magnesium can undergo reactions that result in formation of a stable magnesium or calcium carbonate material.

The majority of the existing mineral and industrial wastes are currently not considered hazardous. However, some of these materials, such as cement kiln dust, are highly alkaline and, as a result, no vegetation can grow on stockpiles of these materials. Reacting the cement kiln dust with $CO_2$ will also greatly reduce the alkalinity, making it possible to vegetate the stockpiles to make them more visually appealing. Similarly, some mining wastes contain the hazardous asbestos minerals temolite ($Ca_2Mg_5Si_8O_{22}$ (OH) 2), actinolite ($Ca_2(Mg,Fe)_5SiBO_{22}(OH)_2$), and chrysotile ($Mg_3Si_2O_5(OH)_4$) Since these minerals contain uncarbonated magnesium and calcium, they can be broken down to harmless forms by carbonation, permanently eliminating any hazard that the asbestos fibers might otherwise present.

Thus, for $CO_2$ sequestration, any mineral or industrial waste that contains either calcium or magnesium in non-carbonate forms, or iron in the $Fe^{+2}$ oxidation state, may be preferred. Other examples include, but are not limited to:

Wollastonite ($CaSiO_3$);
Any of the pyroxene minerals such as diopside ($MgCaSi_2O_6$), hedenbergite ($FeCaSi_2O_6$), augite (($Ca,Mg,Fe)SiO_3$), pigeonite (($Ca,Mg,Fe$) ($Mg,Fe$) $Si_2O_6$), clinoenstatite ($Mg_2Si_2O_6$), or clinoferrosilite ($Fe_2Si_2O_6$);
Serpentine minerals (($Mg,Fe)_3Si_2O_5(OH)_4$);
Epidote ($Ca_2Al_2(Fe,Al)(SiO_4)(Si_2O_7)O(OH)$).

Initial experiments have been conducted by the inventors using a Parr pressurized reaction vessel to contact a few selected materials with carbon dioxide. The quantity of carbon dioxide captured by each material can be determined by the percent weight loss at 950° C. The results obtained show a high degree of $CO_2$ capture in only 24 hours, even without optimization of the process. This work demonstrates the Suitability of the available facilities for conducting $CO_2$ sequestration experiments using pulverized mineral wastes and accurately measuring the degree of $CO_2$ sequestration.

Experiments to determine the feasibility of this concept produced the results shown in Table I. Wollastonite was chosen as a reference mineral because it has the highest calcium content of any naturally-occurring calcium silicate mineral and is therefore expected to be one of the very best natural carbon-sequestering minerals. It absorbs carbon according to the reaction:

$$CaSiO_3+CO_3+CO_2+2H_2O \Longrightarrow CaCO_3+H_4SiO_4$$

The results given in Table 1 clearly show that calcium-rich industrial wastes such as fly-ash and cement kiln dust can absorb significant quantities of carbon dioxide.

TABLE I

Table 1: Uptake of $CO_2$ by different materials (wollastonite, Class C fly-ash, andcement-kiln dust) at 105° C. over a 24-hour period. Each test used material that had been ground to finer than 150 μm. Thermogravimetric analysis (TGA) was used to distinguish between moisture absorption and $CO_2$ absorption. (Elsele and Kawatra, 2003)

| Sample Type, and Atmosphere in Reaction Vessel | % Weight Increase | TGA Results (% weight loss after 2 hours at specified temperature) | | |
|---|---|---|---|---|
| | | 45° C. (moisture) | 250° C. (hydrate) | 950° C. ($CaCO_3$) |
| Wollastonite reacted with Dry $CO_2$ at 60 psi | 0 | .11 | .08 | .95 |
| Wollastonite reacted with Air saturated with water vapor | 0 | .07 | .04 | 1.21 |
| Wollastonite reacted with $CO_2$ at 60 psi, saturated with water vapor | 17.5 | .76 | .62 | 17.72 |
| Class C Fly-Ash (26.9% CaO), before reaction with $CO_2$ | — | 0.22 | 0.27 | 0.36 |
| Class C Fly-Ash (26.9% CaO) reacted with $CO_2$ at 60 psi, saturated with water vapor | 7.6 | 1.00 | 1.96 | 12.85 |
| Cement Kiln Dust (30% CaO), before reaction with $CO_2$ | — | 0.22 | .21 | 12.85 |
| Cement Kiln Dust (30% CaO) reacted with $CO_2$ at 60 psi, saturated with water vapor | 20.8 | 1.06 | 1.61 | 26.51 |

Figure 4:
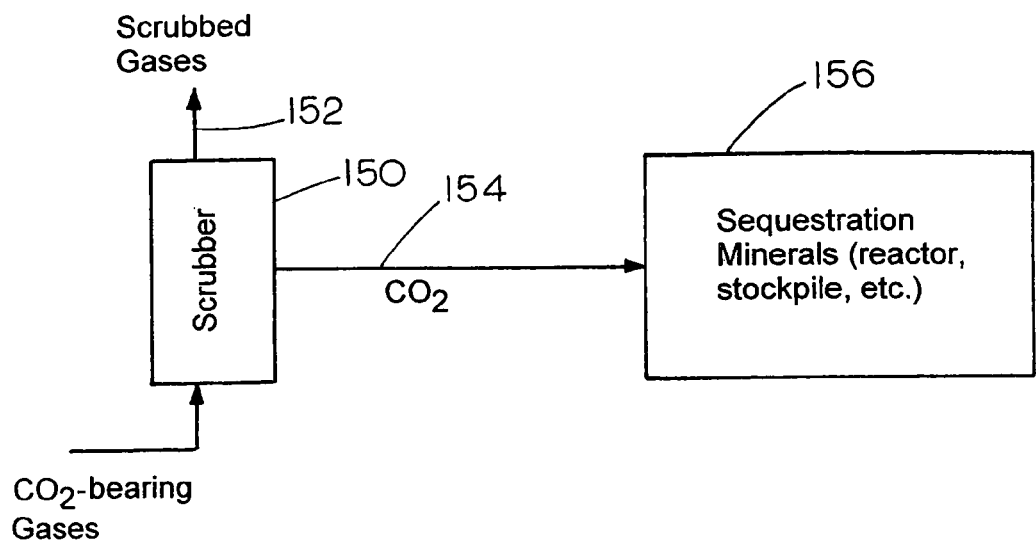
FIG. 4 is a schematic diagram of another process embodiment that produces a concentrated $CO_2$ stream for direct sequestration in particulate waste.
Figure 5:
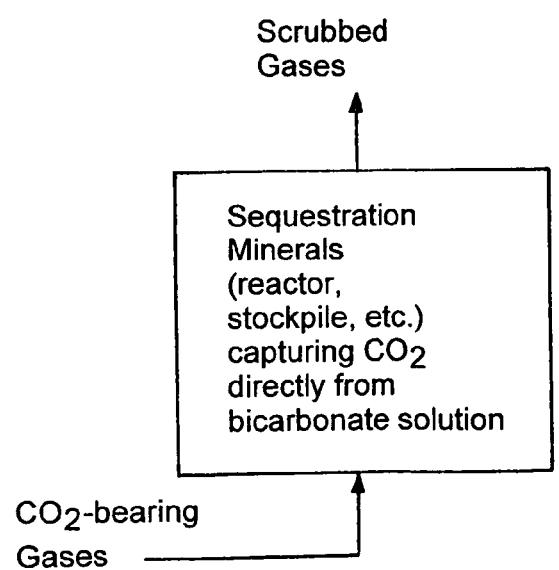
FIG. 5 is a schematic diagram of another process embodiment in which the bicarbonate solution is reacted directly with sequestration minerals and carbonate is regenerated for reuse.

An implementation of this approach can be carried out as shown in FIGS. 4 and 5. In FIG. 4, $CO_2$-bearing gases are directed through a scrubber 150 with the scrubbed gases exiting at 152. The scrubber releases concentrated $CO_2$ at which is sequestered by direct reaction in mineral or particulate industrial wastes at 156.

FIG. 5 shows an alternative process in which the $CO_2$-bearing gases are subjected to a direct reaction of a bicarbonate solution and with the sequestration minerals to fix the $CO_s$ and regenerate the carbonate solution.

Figure 6:
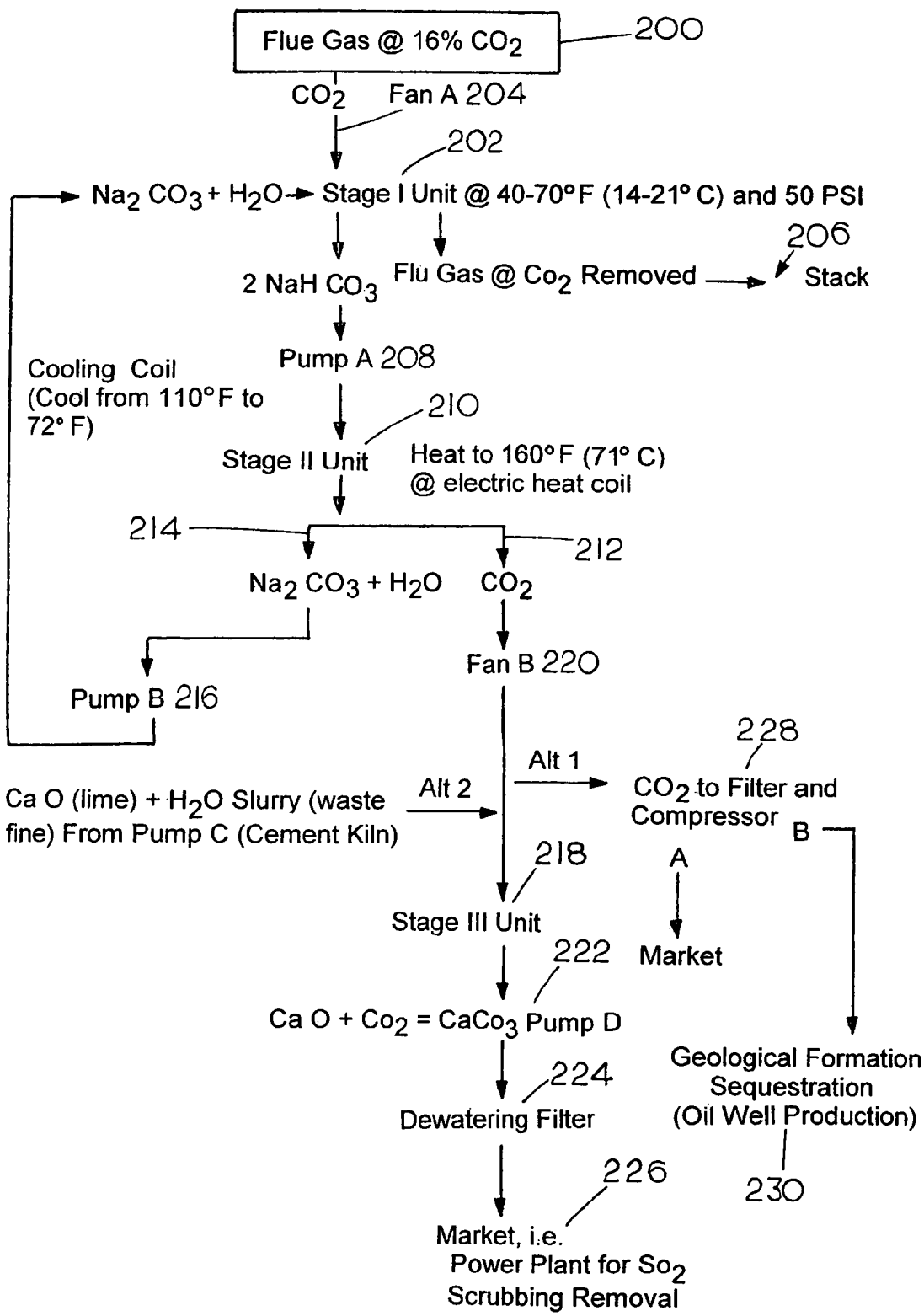
FIG. 6 is a flow diagram of a pilot plant process in accordance with the invention.
Figure 7:
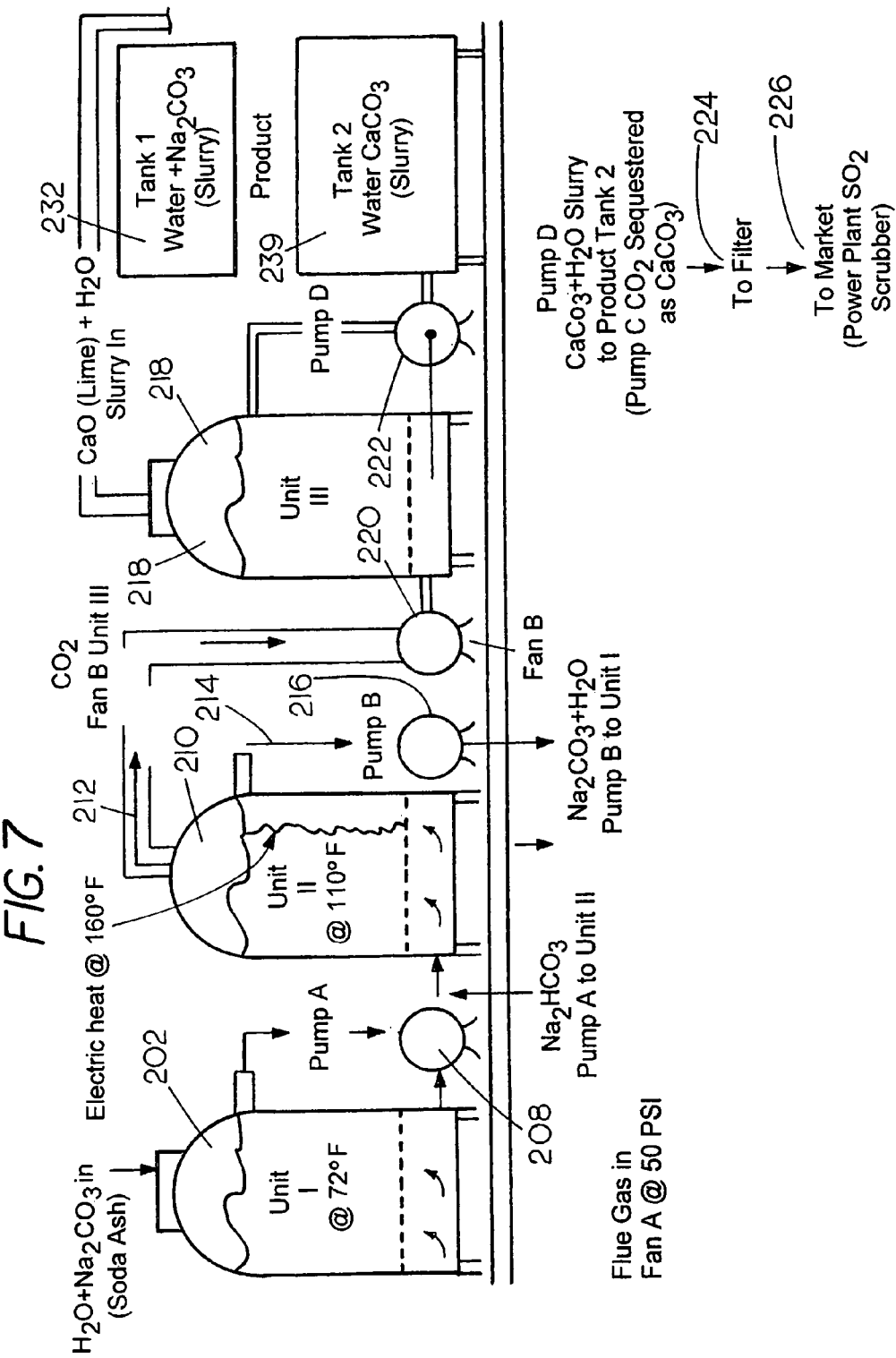
FIG. 7 illustrates an implementation of the process of FIG. 6.

An embodiment of a pilot plant as shown in FIGS. 6 and 7 in which flue gas at 200 enters a stage I unit 202 using a fan 204 where it is treated using a dilute sodium carbonate solution at about 50 psi. The scrubbed flue gas is vented to the stack at 206. Sodium bicarbonate carrying absorbed $CO_2$ is pumped at 208 into a stage II unit where it is heated to 160° F. (71.1° C.) where it decomposes releasing $CO_2$ at 212 and regenerating $Na_2CO_3$ solution at 214. The $Na_2CO_3$ solution is recycled to unit 1 using a pump B at 216. the $CO_2$ proceeds to Unit III at 218 using a fan or compressor 220 where it is reacted with a line (CaO) water slurry where it is reacted to form $CaCO_3+H_2O$ and thereafter is pumped using a pump 222 to a dewatering filter 224 (dryer) and thereafter to an $SO_2$ removal process at 226, if required. Water is recycled as make-up water. In the alternative, concentrated $CO_2$ may be purified and compressed at 228 and sequestered or otherwise used as at 230. Product tanks are shown at 232 and 234 for carbonate slurries.

Example I

Tests were conducted to determine carbon dioxide absorption with various concentrations of sodium carbonate solutions. These experiments were carried out to determine the concentration of sodium carbonate that is most effective for absorbing carbon dioxide from a feed gas stream containing approximately 16% $CO_2$, which mimics the high $CO_2$ concentration in many flue gases. This revealed surprising information that proved useful for designing a $CO_2$ scrubber based on this absorbent.

Laboratory tests were conducted on concentrations of sodium carbonate that were varied from 1.875 percent to 20 percent. The values of $CO_2$ concentrations remaining in the gas stream after passing through the scrubber showed that solutions with lower concentrations of sodium carbonate, in fact, produced markedly better performance than those with higher sodium carbonate concentrations.

Materials and Procedures

The absorbent used was reagent-grade sodium carbonate, purchased fresh from Aldrich Chemical Co. to ensure that it would have consistent properties.

Figure 8:
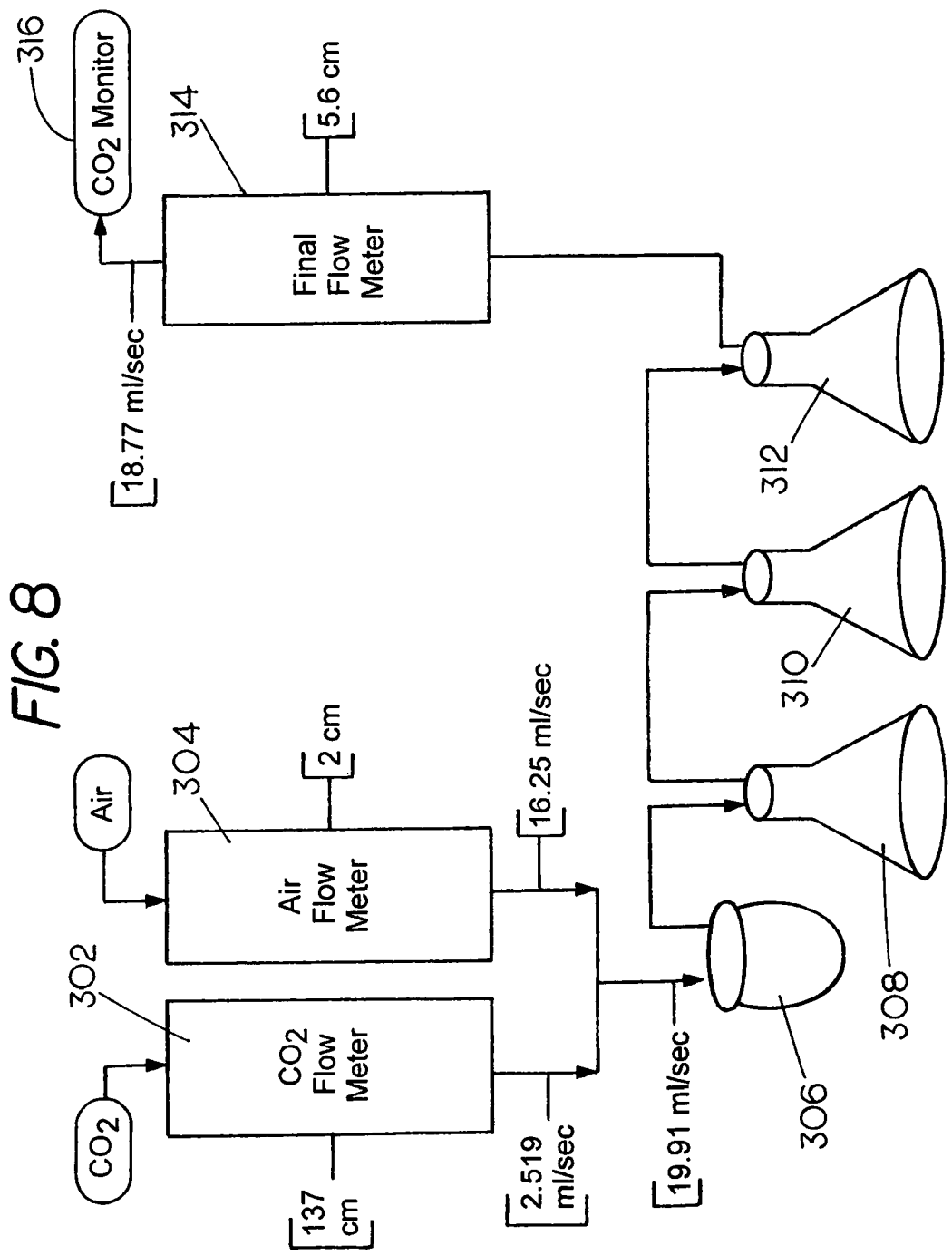
FIG. 8 is a schematic representation of a laboratory system used in Example I.

The sodium carbonate was dissolved in distilled water at several different concentrations, and then used to absorb $CO_2$ in the gas mixing and absorption system shown in FIG. 8. The system shown generally at 300 included a $CO_2$ flow meter 302, an air flow meter 304, a mixing vessel 306 and three absorption flasks 308, 310, 312, a final flow meter 314 fed the remaining gas into a $CO_2$ monitor 316.

The experiments were run by metering air and $CO_2$ together at appropriate flow rates to produce a gas mixture containing approximately 16% $CO_2$. The gases were mixed in the initial mixing vessel 306 and then passed through the chain of the absorption flasks, 308, 310, 312, each of which contained 800 ml of absorbent solution. The gas exiting the absorption flasks and final flow meter were then analyzed in real time to determine the $CO_2$ content.

Results and Discussion

Initial experiments were carried out using solutions with sodium carbonate concentrations of 10% and 20% by weight. It was noted that the lower concentration was actually more effective for absorbing $CO_2$ than the higher concentration. A series of experiments were therefore carried out at sodium carbonate concentrations of 0, 1.875, 2.25, 2.75, 2.5, 5, 10, 15, and 20% by weight to determine the optimum level. The results were shown in FIG. 9.

Figure 9:
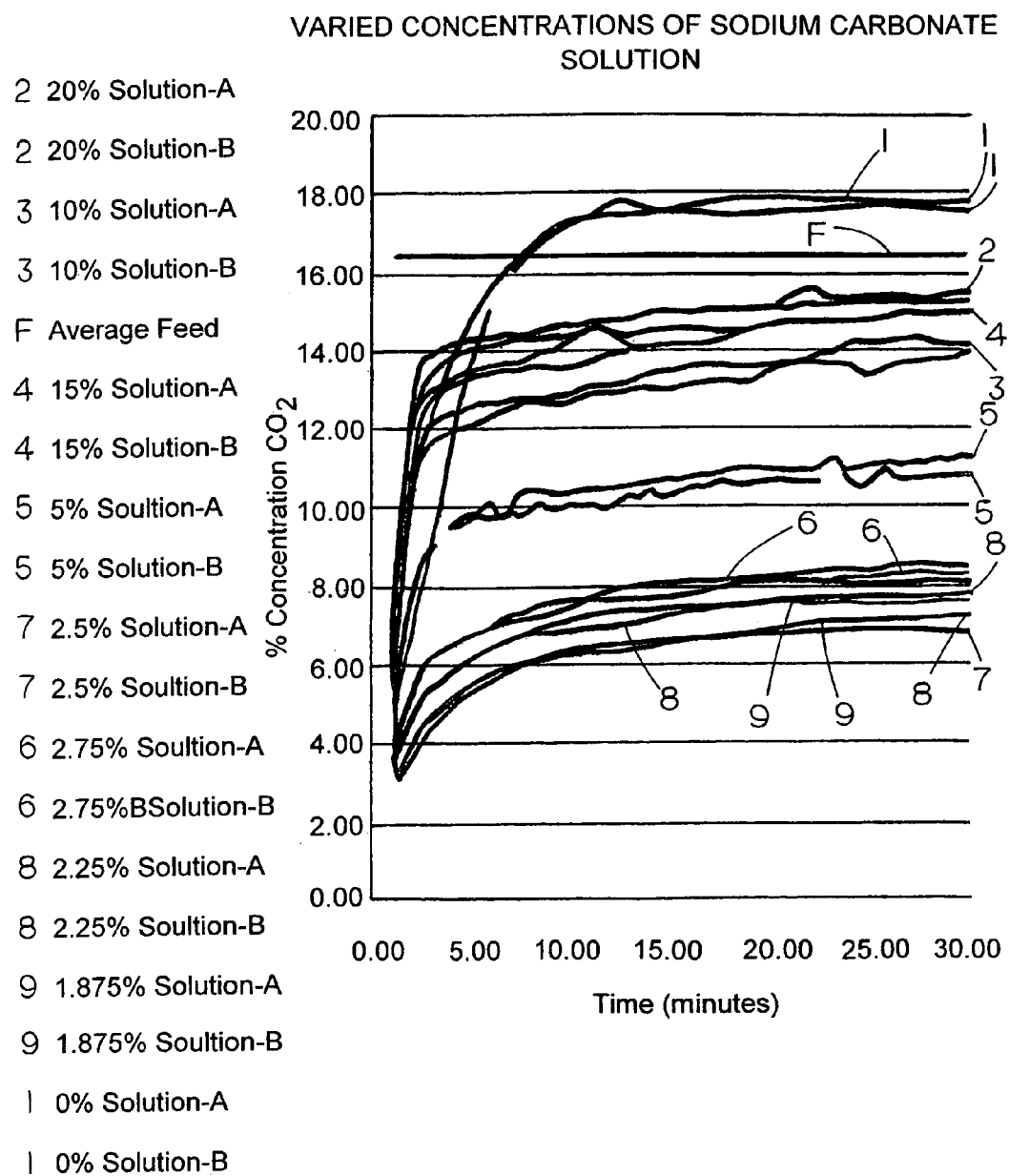
FIGS. 9 and 10 are graphical representations of absorption of $CO_2$ from a relatively high $CO_2$ gas by solutions of sodium carbonate of varying concentrations.
Figure 10:
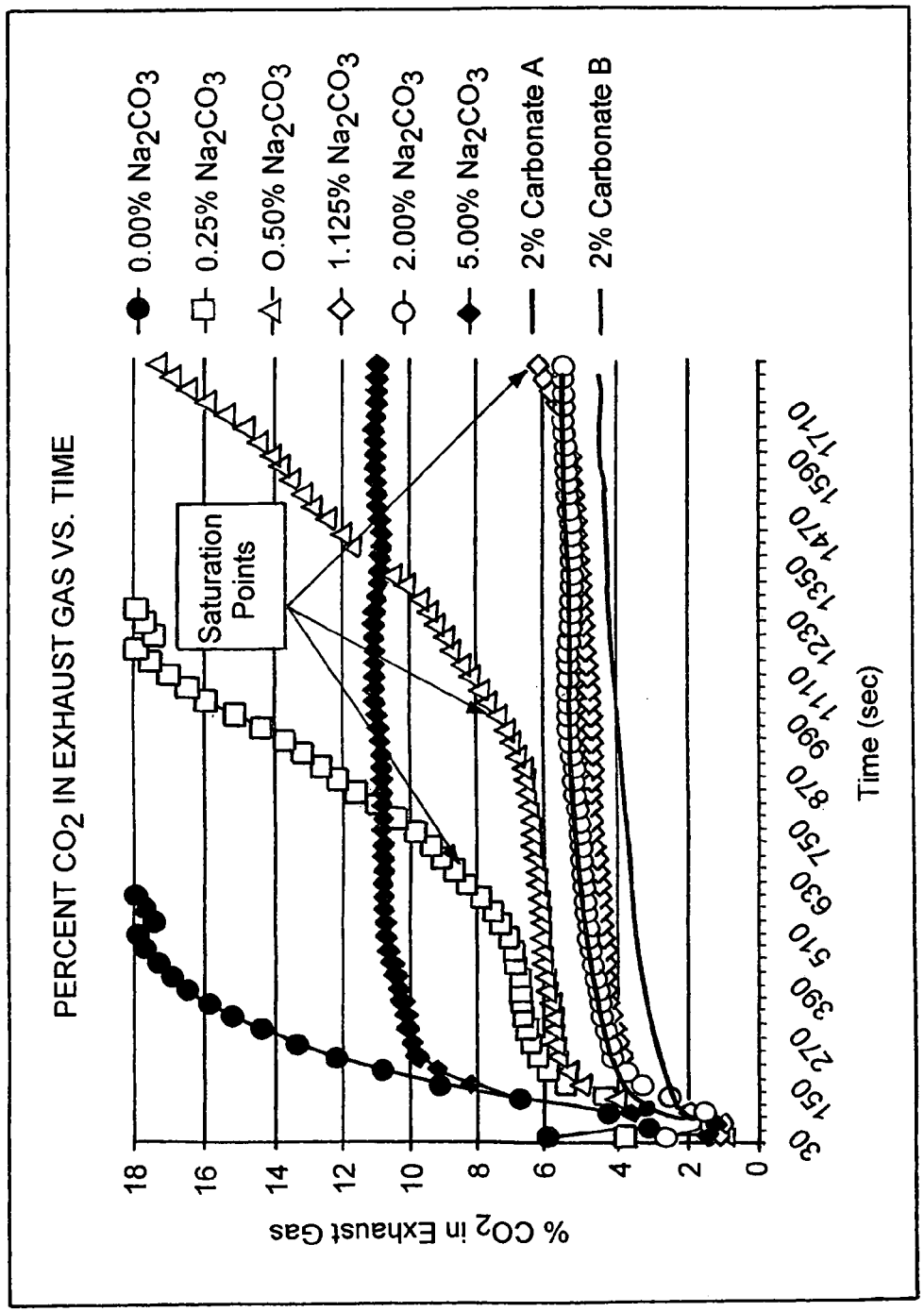

In FIG. 9: Absorption of $CO_2$ by the absorbent solution as the sodium carbonate concentration was varied. The plotted values are the $CO_2$ concentrations remaining in the gas after passing through the scrubber, and so lower values indicate superior $CO_2$ removal.

As the Example I indicates, the sodium carbonate solution is preferably dilute, i.e., possibly containing from 1% to a value $\leqq$5% w/w of sodium carbonate. A more preferred solution contains from ~1.5% to 2.75% w/w or less sodium carbonate and a most preferred solution contains from 1.85% to 2.75% or about 2% w/w sodium carbonate.

It thus may be said that the optimum concentration of sodium carbonate was very close to 2% by weight. This gave markedly better performance than either much higher sodium carbonate levels, or distilled water used as absorbent with no sodium carbonate addition at all.

An absorption train was constructed where a gas mixture containing a nominal 16% $CO_2$ was passed through the absorption solution. The concentration of $CO_2$ leaving the absorption train was then measured, with lower levels of $CO_2$ in the exit gas indicating a higher level of $CO_2$ removal. Experiments were conducted for 30 minutes, using sodium carbonate solutions of 0.0%, 0.25%, 0.5%, 1.125%, 2%, and 5%. These concentrations of sodium carbonate were chosen to confirm the optimum concentration for a high degree of $CO_2$ removal. The results are shown in FIG. 1.

When pure water was used in the absorption train, as in Example I, it quickly saturated with $CO_2$ and stopped absorbing $CO_2$ from the feed gas. At 0.25% sodium carbonate, the $CO_2$ levels of the gas exiting the absorption train was reduced for approximately 400 seconds before the solution saturated. At 0.50% sodium carbonate, the time needed for saturation increased to approximately 800 seconds, and at 1.125% sodium carbonate it required approximately 1800 seconds to saturate. The 2.00% sodium carbonate was run as a repeat of previous duplicate results (2% Carbonate A and 2% Carbonate B), and shows that the current results (Example II) are replicating the previous results (Example I) very closely. Increasing the concentration to 5.00% sodium carbonate showed a reduced level of absorption of $CO_2$.

These results are consistent with the following behavior: When sodium carbonate concentrations are low, the $CO_2$ is absorbed readily until all of the sodium carbonate present has converted to sodium bicarbonate. At this point, the solution is saturated and must be regenerated before it can absorb any additional $CO_2$. The quantity of $CO_2$ that can be absorbed before the solution saturates progressively increases as the sodium carbonate concentration increases, until approximately 2% sodium carbonate. At this point, the addition of more sodium carbonate increases the ionic strength of the solution to the point where it is more difficult to dissolve additional $CO_2$. Therefore, there is an optimum level at approximately 2% sodium carbonate where there is enough sodium carbonate present to absorb a significant amount of $CO_2$, but not so much that it retards dissolution.

In any event, Example II confirms that the lower end of the useful range is about 1% w/w sodium carbonate.

In Example II, additional tests were conducted using solutions having generally lower concentrations of sodium carbonate. Conditions and materials were similar to those used in Example I.

Results are also compared in Table No. II below:

TABLE No. II $CO_2$ Removal at Varied Concentrations of Sodium Carbonate Solution

| Concentration of Sodium Solution Average feed % | % Concentration $CO_2$ | | Estimated % $CO_2$ Removed | | % Removed | |
|---|---|---|---|---|---|---|
| | 5 Min. | 10 Min. | 5 Min. | 10 Min. | 5 Min. | 10 Min. |
| 0% | 16.3% | 16.3% | -.- | -.- | -.- | -.- |
| 1.85% | 5.2% | 6.1% | 11.1 | 10.2 | 68.1 | 62.6 |
| 2.25% | 5.3% | 6.1% | 11.0 | 10.2 | 67.5 | 62.6 |
| 2.50% | 5.8% | 6.7% | 10.5 | 9.6 | 64.4 | 58.9 |
| 2.75% | 6.4% | 7.4% | 9.9 | 8.9 | 60.7 | 54.6 |
| 5.0% | 9.5% | 10.1% | 6.8 | 6.2 | 41.7 | 38.0 |
| 10.0% | 12.1% | 12.8% | 4.2 | 3.5 | 25.8 | 21.4 |
| 15.0% | 13.2% | 13.8% | 3.1 | 2.5 | 19.0 | 15.3 |
| 20.0% | 14.1% | 14.5% | 2.2 | 1.8 | 13.5 | 11.0 |

Example II 18a+18b

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A method of capturing and sequestering carbon dioxide in carbon dioxide bearing gases of interest comprising:
   (a) capturing carbon dioxide by reacting a gas of interest with an aqueous sodium carbonate solution to form a bicarbonate solution; and
   (b) sequestering said captured $CO_2$ by reacting with a material selected from waste materials containing a metal selected from alkaline earth metals including calcium and magnesium, and iron in non-carbonate form or mixtures thereof.

2. A method as in claim 1 wherein said waste material is selected from the group consisting of cement kiln dust (CKD), fly-ash, iron slag, minerals and combinations thereof.

3. A method as in claim 2 wherein said waste material includes calcium oxide (CaO).

4. A method as in claim 2 wherein said waste material includes fly-ash.

5. A method as in claim 1 wherein said waste material includes calcium oxide (CaO).

6. A method as in claim 1 wherein said waste material includes fly-ash.

7. A method as in claim 1 wherein said carbon dioxide bearing gas of interest is selected from electric power plant and cement kiln effluent.

8. A method as in claim 1 wherein (b) involves a direct reaction of said bicarbonate solution with said waste material.

9. A method as in claim 8 including recycling a portion of said carbonate solution regenerated in said sequestering.

10. A method as in claim 8 wherein said waste material is selected from the group consisting of cement kiln dust (CKD), fly-ash, iron slag, minerals and combinations thereof.

11. A method as in claim 1 wherein said waste material includes material selected from the group consisting of wollastonite ($CaSiO_3$); any of the pyroxene minerals diopside ($MgCaSi_2O_6$), hedenbergite ($FeCaSi_2O_6$), augite (($Ca,Mg,Fe$)$SiO_3$), pigeonite (($Ca,Mg,Fe$)($Mg,Fe$) $Si_2O_6$), clinoenstatite ($Mg_2Si_2O_6$), or clinoferrosilite ($Fe_2Si_2O_6$) serpentine minerals (($Mg,Fe$)$_3Si_2O_5(OH)_4$); and epidote ($Ca_2Al_2(Fe, Al)(SiO_4)(Si_2O_7)O(OH)$).

12. A method as in claim 1 wherein said carbonate solution is additive-free.

13. A method as in claim 1 wherein said aqueous carbonate solution contains from about 1% to 5% w/w sodium carbonate.

14. A method as in claim 13 wherein said aqueous carbonate solution contains from about 1.125% to 2.75% w/w sodium carbonate.

15. A method as in claim 1 wherein said aqueous carbonate solution contains about 2% w/w sodium carbonate.

16. A method as in claim 8 wherein said capture and said sequestration occur in the same vessel.

17. A method of capturing and sequestering carbon dioxide in carbon dioxide bearing gases of interest comprising:
   (a) capturing carbon dioxide by reacting a gas of interest with an aqueous alkali metal carbonate solution to form a bicarbonate solution wherein said carbonate is selected from the group consisting of sodium carbonate and potassium carbonate; and
   (b) releasing said $CO_2$ from said bicarbonate solution by heating said bicarbonate solution and storing said released $CO_2$ under stable conditions.

18. A method as in claim 17 wherein said aqueous alkali metal carbonate solution is a dilute solution of sodium carbonate.

* * * * *